United States Patent [19]
Griffin et al.

[11] Patent Number: 5,161,102
[45] Date of Patent: Nov. 3, 1992

[54] COMPUTER INTERFACE FOR THE CONFIGURATION OF COMPUTER SYSTEM AND CIRCUIT BOARDS

[75] Inventors: Michael R. Griffin; Daryl D. George, both of Houston; Curtis R. Jones, Jr., Cypress, all of Tex.

[73] Assignee: Compaq Computer Corporation, Houston, Tex.

[21] Appl. No.: 311,021

[22] Filed: Feb. 13, 1989

Related U.S. Application Data

[63] Continuation-in-part of Ser. No. 293,315, Jan. 4, 1989, which is a continuation-in-part of Ser. No. 242,734, Sep. 9, 1988, abandoned.

[51] Int. Cl.$^5$ .............. G06F 9/00; G06F 13/00; G06F 3/14
[52] U.S. Cl. .................. 395/800; 364/240; 364/286.2; 364/282.1; 364/257.2; 364/926.9; 364/927.2; 364/488; 364/DIG. 1; 364/DIG. 2; 340/707
[58] Field of Search ... 364/200 MS File, 900 MS File, 364/488, 489, 490, 491; 340/707

[56] References Cited

U.S. PATENT DOCUMENTS

| | | | |
|---|---|---|---|
| 4,562,535 | 12/1985 | Vincent et al. | 364/200 |
| 4,568,072 | 2/1986 | Piotroski | 364/479 |
| 4,760,553 | 7/1988 | Buckley et al. | 364/900 |
| 4,850,104 | 7/1989 | Matrone et al. | 29/705 |
| 4,868,783 | 9/1989 | Anderson et al. | 364/900 |
| 4,899,274 | 2/1990 | Hansen et al. | 364/200 |

OTHER PUBLICATIONS

Carole Boggs Matthews and Martin S. Matthews, Using Wordstar Professional MicroPro, Osborne/McGraw Hill, 1989.
IBM Corp., Personal System/2 Model 80 Technical Reference, 1st Edition, Apr. 1987, pp. 2-51 to 2-63.
IBM Corp., Supplements for the PS/2 Model 70, Hardware Interface and BIOS Interface Technical References, PS/2 Model 70 Programmable Option Select section, pp. i to 57, Sep. 1988.
EISA Press Release, Sep. 13, 1988.
PC Magazine, The Great-Divide—EISA v. MicroChannel, pp. 165-186, Dec. 27, 1988.

*Primary Examiner*—Thomas C. Lee
*Assistant Examiner*—Mehmet Geckil
*Attorney, Agent, or Firm*—Pravel, Gambrell, Hewitt, Kimball & Krieger

[57] ABSTRACT

A computer program permits a user to simulate configuring add-in boards for a computer system. A board may be "pulled" from an inventory list for inspection, and may be "inserted" into any legal slot in the computer system. The program can automatically generate any permissible configurations for the board, i.e., configuration of the board's address resource allocations that avoid conflicts with the address resource allocations of other, already-installed boards. The user may select from among permissible configurations; for a selected configuration, the user may display to screen or printer a drawing of the switch- and jumper settings on the board that are needed to implement the selected configuration.

13 Claims, 18 Drawing Sheets

File View Configure Inventory

COMPAQ DESKPRO 386s Model 40 — 1002

S CPU = 386  Speed = 16 Mhz  Memory 5 (16)
4 (16)
3 (16)
2 (16)
1 (16)

3D16SM40.CPQ
COM DCA
COM DCA
COM IBM
COM IBM
COM IBM
COM IBM
COM IDEA
COM IDEA

1006 ←

1004

F1 = Help

Available systems — 1000

| File | Description |
|---|---|
| 0D08_M2 | COMPAQ DESKPRO 8086/8 Model 2 |
| 2D12_M | COMPAQ DESKPRO 286/12 Model 1 |
| 2D12_M20 | COMPAQ DESKPRO 286/12 Model 20 |
| 2D12_M40 | COMPAQ DESKPRO 286/12 Model 40 |
| 2PIIIM20 | COMPAQ PORTABLE III Model 20 |
| 2PIIIM40 | COMPAQ PORTABLE III Model 40 |
| 2PII_M2 | COMPAQ PORTABLE II Model 2 |
| 2PII_M4 | COMPAQ PORTABLE II Model 4 |
| 2SLT_M20 | COMPAQ SLT/286 12MHz Model 20 |
| 2SLT_M40 | COMPAQ SLT/286 12MHz Model 40 |
| 3D16SM1 | COMPAQ DESKPRO 386s Model 1 |
| 3D16SM20 | COMPAQ DESKPRO 386s Model 20 |
| 3D16SM40 | COMPAQ DESKPRO 386s Model 40 |
| 3D16_M40 | COMPAQ DESKPRO 386s Model 40 |
| 3D20EI110 | COMPAQ DESKPRO 386/20e Model 100 |
| 3D20EM1 | COMPAQ DESKPRO 386/20e Model 1 |

. to Inspect Systems — 1008

FIG. 1

File View Configure Inventory ——1006

```
┌─ COMPAQ DESKPRO 386/16 Model 40 ──┐  ┌──────── Boards Inventory ────────┐
│ S CPU = 386   Speed = 16          │  │                                   │
│                                   │  │                                   │
│ 8 (8s)                   MFC COMPAQ    FPS 181 - 001 / 021 Controller    │
│ 7 MFC COMPAQ FPSW 8      MFC COMPAQ    FPS - ESDI 996 130 / 300 Controller│
│ 6 (16)                   MFC COMPAQ    FPSW 336 Multipurpose Ctlr        │
│ 5 (8)                    MFC COMPAQ    FPSW 519 Multipurpose Ctlr        │
│ 4 (16)                   MFC COMPAQ    FPSW 815 Multipurpose Ctlr        │
│ 3 (16)                   MFC COMPAQ    FPSW 957 Multipurpose Ctlr        │
│ 2 (8)                    MFC IBM       Serial / Parallel Adapter         │
│ 1 MEM COMPAQ 32bit       MSD COMPAQ    135MB Tape Host Adapter -774      │
│                          MSD COMPAQ    ESDI 1 : 1 Disk Ctlr WD1007AWAH   │
│                      3D1 MSD COMPAQ    ESDI 3 : 1 Disk Ctlr WD1005WAH    │
│                          MSD COMPAQ    ESDI External FD Controller       │
│                          MSD COMPAQ    ST506 Disk Ctlr WD1002WAH         │
│                          MSD TECMAR    PC HOST ADAPTER                   │
│                          MSD TECMAR    PC - 36 TAPE CONTROLLER           │
│                          NET 300M      EtherLink 30500B ASM 34 - 0780    │
│                          NET 3COM      EtherLink 30501 ASM 1221          │
│                          NET 3COM      EtherLink II 3C503                │
└───────────────────────────────────┘  └───────────────────────────────────┘
                                              ↑
                                            1004
                    ↑
                  1002
```

FIG. 2

F1 = Help

..PgUp.PgDn to view——1008

File View Configure Inventory — 1006

COMPAQ DESKPRO 386 / 16 Model 40
S CPU = 386 Speed = 16

```
                                    1002                Boards Inventory ——————— 1004
                                    |                                                      F1 = Help
8 (8s)
7 MFC COMPAQ FPSW 8         MFC  COMPAQ    FPS 181 - 001 / 021 Controller
6 (16)                      MFC  COMPAQ    FPS - ESDI 996 130 / 300 Controller
5 (9)                       MFC  COMPAQ    FPSW Multipurpose Ctlr
4 (16)                                         In - Hand                      lr
3 (16)                                                                        lr
2 (18)                      MFC COMPAQ FPSW 336 Multipurpose Ctlr              lr
1 MEM COMPAQ 3                  16-bit Card 9.39" Long
                                Available Slots : 3, 4, 6                   - 774
                                                                            7AWAH
                                Integrated Fixed DISKCTLR                   5wah
                                Floppy diskette controller                   ler
                                Parallel Port                                 H
                                Serial Port MSD  TECMAR     PC - 36 TAPE CONTROLLER
                            NET  3COM       EtherLink 3C500B ASM 34 - 0780
                            NET  3COM       EtherLink 3C501 ASM 1221
                            NET  3COM       EtherLink II 30503
```

1010

← Place in System → Return to Inventory —— 1008
. Select Function  F2 = Inspect Choices  Esc = Cancel

FIG. 3

```
┌─────────────────────────────────────────────────────┐
│                         Boards Inventory            │─1004
│   FDC  COMPAQ         ( 1 : 1 ) ESDI Fixed Disk Ctlr│
│   FDC COMPAQ          ( 3 : 1 ) ESDI Fixed Disk Ctlr│
│   FDC COMPAQ          ST506 Fixed Disk Ctlr         │
│   MEM COMPAQ          32 - Bit System Memory Board  │
│   MEM INTEL           Above Board 286               │
│ ▶ MFC  COMPAQ         Multipurpose FPSW Board       │
│   MSE MICROSOFT       Bus Mouse              (6.1)  │
│   NET 3 COM           Etherlink Plus / Adapter - 16 │
│   NET AT & T          StarLan Network Adapter       │
│   Net IBM             Token Ring I                  │
│   VID AST             Color GraphPlus               │
│   VID COMPAQ          CECGB Controller              │
│   VID COMPAQ          VDU Controller                │
│   VID HERCULES        InColor Card                  │
└─────────────────────────────────────────────────────┘
```

*FIG. 4A*

```
┌──────────────────────────────────────────────┐
│═════════════════ In - Hand Window ═══════════│─1010
│      MFC COMPAQ Multipurpose FPS board       │
│       16 - Bit Card 5.00" High x 9.00" Long  │
│              Available Slots : 3 , 6         │
│           ▶ Parallel Communications Port     │
│           Asynchronous Communications Port   │
│              Floppy Diskette Controller      │
└──────────────────────────────────────────────┘
```

*FIG. 4B*

Example Of Function Choice Window :

```
┌──────────────────────────────────────────────┐
│═══════════ Parallel Communications Port ═════│─1012
│                CHOICES :                     │
│                  LPT1                        │
│                  LPT2                        │
│                  LPT3                        │
│                  DISABLE                     │
└──────────────────────────────────────────────┘
```

*FIG. 4C*

Example of Board Detail Window

```
┌─────────── Parallel Port ──────────────────┐ /1014
│ Resource    Qty    Setting    Value    Use │
│   IRQ       1      1 of 3     7            │
│   PORT      4      1 of 3     3BC          │
└────────────────────────────────────────────┘
```

FIG. 5A

Example of Board Detail Window showing Memory Allocation

```
┌─────────────── Memory ─────────────────────┐ /1016
│           2048K Memory Installed           │
│                                            │
│ Resource   Qty     Setting    Value    Use │
│   CONV     640k    1 of 1     0000         │
│   EXTM     384k    1 of 1     FA000        │
│   EXTM     1024k   1 of 1     10000        │
│   MWIN     64k     1 of 3     C000         │
└────────────────────────────────────────────┘
```

FIG. 5B

File View Configure Inventory

COMPAQ DESKPRO 386/16 Model 40
S CPU = 386 Speed = 16 MHz Memory 640 / 384k 8 (8s)
7 MFC COMPAQ FPSW 815 Multipurpose Ctlr
6 (16)
5 (8)
4 (16)
3 (16)
2 (8)
1 Mem COMPAQ 32bit 386/16 System Memory 413

3D16_M40.CPQ

| | | |
|---|---|---|
| MSD | COMPAQ | ESDI External FD Controller |
| MSD | COMPAQ | ST506 Disk Ctlr WD1002WA |
| MSD | TECMAR | PC HOST ADAPTER |
| MSD | TECMAR | PC - 36 TAPE CONTROLLER |
| NET | 3COM | EtherLink 3C500B ASM 34 - 0780 |

F1 = Help

Inventory
llel Printer 990
Diskette / Printer
1 / 021 Controller
96 130 / 300 Controller
ultipurpose Ctlr
ultipurpose Ctlr
ultipurpose Ctlr
ultipurpose Ctlr
allel Adapter
Host Adapter - 774
isk Ctlr WD1007AWAH
isk Ctrl WD1005WAH

FIG. 6

File View Configure Inventory

COMPAQ DESKPRO 386/16 Model 40
Trial Configuration 1

| S | CPU | Slot Vendor / Product | Resource |
|---|---|---|---|
| 8 | (82 | | 413 |
| 7 | MFC | 1 MEM COMPAQ 32bit 386/16 System Memory | |
| 6 | (16 | Conventional (Base) Memory | C ONV 0000 : 0 (640K) |
| 5 | (8) | | EXTM FA000 : 0 (384K) |
| 4 | (16) | Extended Memory | MISC 1 |
| 3 | (16) | Expanded Memory Window | RAM E000 : 0 (64K) |
| 2 | (8) | 7 MFC COMPAQ FPSW 815 Multipurpose Ctlr | |
| 1 | MEM | Integrated Fixed Disk Ctlr | DMA 2 |
|   |   |   | IRQ 6 |
|   |   |   | PORT 3F0 - 3F7 |
|   |   |   | IRQ 14 |
|   |   |   | PORT 1F0 - 1F7 |
|   |   | Parallel Port | IRQ 7 |
|   |   |   | PORT 3BC - 3BF |
|   |   | Serial Port | IRQ 4 |
|   |   |   | PORT 3F8 - 3FF |

F1 = Help

. to View Details
Enter = Accept   Esc = Cancel   +,- to View Other Configuration

FIG. 7

FILE MENU :

VIEW MENU :

CONFIGURE MENU :

INVENTORY MENU :

COMPUTER INTERFACE FOR THE CONFIGURATION OF COMPUTER SYSTEM AND CIRCUIT BOARDS

This is a continuation-in-part of copending application Ser. No. 293,315, filed Jan. 4, 1989, which is a continuation-in-part of copending application Ser. No. 242,734, filed Sep. 9, 1988 now abandoned.

BACKGROUND OF THE INVENTION

The present invention relates to a software utility intended to simplify the installation of add-in boards in a computer, e.g., in the slots of an industry standard architecture (ISA) computer system. (The ISA is exemplified by computer systems such as the IBM PC and the Compaq Deskpro 286.)

The drawings are Copyright 1989 Compaq Computer Corporation, All Rights Reserved. Permission is granted to make copies of the drawings solely in connection with obtaining a copy of this patent and for no other purpose.

In this context, the word "boards" is a common shorthand reference for an add-in circuit card. When properly configured and installed in an open slot, the hardware on a board operates in conjunction with other components of the computer system to perform certain functions.

Widely available boards include video display adapters, disk controllers, expanded memory boards, serial/parallel adapters, mouse controllers, network links, and communication adapters, to name but a The use of interchangeable circuit boards having various functions allows for low cost highly flexible computer systems to be developed.

Any board installed in a computer system must have certain of the system's "resources" allocated to it in order to be able to exchange signals to communicate with other components of the system.

Generally speaking, a bus is a group of electrical connections. Each connection resembles a telephone party line and to which a number of signal-generating and signal-processing components are connected.

Various components in the computer system communicate with each other by "broadcasting" signals on one or more of these electrical connections. Such components can include the central processing unit (CPU), system memory, input/output (I/O devices (e.g., disk drives, printers, video terminals, and the like) and other components.

Each such signal that is broadcast on a "party line" in this manner is typically coded with an identifier designating the component which is the intended recipient of the signal. A component connected to a signal bus in effect "listens" electrically to that bus for signals encoded with that component's own identifier. Each component on the signal bus "hears" all signals that are broadcast, but responds only to signals that include its identifier.

For example, the CPU might perform a write-to-memory operation by broadcasting a signal that is encoded with (a) the identifier for the particular memory device that is to be written to, and (b) the actual datum that is to be written to that memory device. All memory devices on the signal bus would "hear" the signal, but only one in particular would recognize its identifier and save the accompanying datum in its electronic memory circuits. In like manner, the CPU might later perform a read-from-memory operation by signalling the memory device to send a return data signal back to the CPU.

Signal buses generally contain four types of signal lines, on which signals can be broadcast. They are memory lines; interrupt request lines; direct memory access (DMA) channels; and input/output (I/O) ports.

Memory lines are used to transmit signals calling, e.g., for reading from or writing to memory. This process is briefly discussed above.

Interrupt request lines are typically designated IRQ 1, IRQ 2, etc. They are used to send interrupts to the CPU (or other interupt-supporting component). Generally speaking, when a component sends an interrupt to the CPU, the CPU suspends execution of the current program instruction(s); executes a specific "interrupt handler" routine or set of instructions associated with the particular interrupt; and resumes execution of the suspended current program instruction(s) at the point where it left off.

Direct memory access (DMA) channels permit specially equipped components to address memory without the assistance of the CPU (thus freeing the CPU for other work). DMA channels are typically used by components such as disk drives.

Input/output (I/O) ports are electrical connections to which external devices such as printers, telephone connections, etc., may be attached.

When an add-in board is plugged into an empty slot in a computer system, in effect it is being plugged into the four types of "party line" signal lines just described. Plainly, it is ordinarily preferable that no two components on a signal line be allocated the same system resources; electronic chaos could result if this were permitted to happen without compensating for that possibility in some way.

Circuit boards must generally be allocated one or more of these system resources, including interrupt request lines, DMA channels, input/output ports and memory address. It is generally advisable for the circuit board to be configured such that it is assigned unique system resources, i.e., those not already allocated to other circuit boards or components. However, in some instances, system resources may be allocated in such a manner where they may be shared by more than one circuit board or component.

Configuring a variety of circuit boards in a computer system may lead to conflicts in the allocation of common computer system resources. Various choices must be made for selecting the interrupt request lines, DMA channels and memory address locations which do not conflict with those of other circuit boards. Once the operator has selected the resources to be assigned to the board, the boards must actually be configured. The configuration of the boards often entails the setting of various jumpers and switches. A determination of the switch or jumper settings is necessary to allocate the specific resources for the circuit board and generally requires reference to documentation which accompanies the circuit board and/or computer system. In addition to the hardware configuration as described above, the circuit boards may also require software initialization which allocates the various resources to the circuit board and informs the computer system of the resources, such as input/output or communications ports used by the circuit board.

It will be appreciated that the configuration of multiple circuit boards within a computer system would require reference to various board and computer system manuals. Further, it may require reconfiguring boards already installed in a system, necessitating additional review of manuals and setting of switches, jumpers or software.

SUMMARY OF THE INVENTION

The present invention is directed to a computerized interactive display method for controlling the configuration of a computer system utilizing interchangeable circuit boards which share common computer resources.

More particularly, the present invention allows the operator to select from various computer systems and circuit boards and set the configuration for the system and circuit boards in an interactive mode with a host computer, which instructs the operator as to the configuration process without resort to various circuit board and computer manuals. The present invention also displays the necessary hardware settings, such as switch and jumper positions, to properly allocate resources to avoid a conflict between circuit boards requesting the same computer resources. The present invention also permits the user to model various computer system and circuit board combinations without the physical systems and circuit boards.

The present invention is a menu driven interface which permits the user to select a computer system to be configured from a list of displayed systems. Computer systems are identified in a database as a series of files which describe the type of computer system and other characteristics of the computer such as the type of processor and processor speed, amount of non-volatile memory available, the number of expansion slots available on the system and the size and type of each expansion slot. The various types of computers described in the listing are initially displayed by type. The operator may also request the host computer to display the various characteristics for each of the computers displayed. It will be appreciated that the listing of computers may include descriptions of commercial or generic computers or descriptions of particular computers which already have an existing configuration.

Following selection of the computer system to be configured, the menu-driven interface permits the operator to inspect the computer system to determine if circuit boards have already been configured and added to the computer system. The operator may then select from a listing of circuit boards to be added to the selected computer. The operator selects a board which is inserted into the selected computer system in the first available system slot of the appropriate type. For example, it is clear that a 32 bit Extended Industry Standard Architecture (EISA) memory board will not fit into an 8 bit ISA system slot. Thus, the present invention will allocate available slots to a circuit board having a similar data path. Various circuit boards may have one or more operational functions which may be activated. The operator can request a listing of operational functions which may be performed by a board and select the functions to be activated. The operator can review the common resources required by the circuit board functions selected and select alternative settings when necessary.

Once the circuit board has been allocated a system slot and the functions selected, the present invention displays circuit board hardware settings required to initialize the circuit board based on the functions selected and utilize the selected resources. The board settings may include various types of jumper and switch settings which may be set on the board. It will be appreciated that where the present invention is modeling a computer system configuration, as opposed to actually configuring a system, it will not be necessary for the operator to make hardware settings.

The operator instructs the present invention to determine if the selected computer and circuit boards can be configured based on the function selected. The configuration process attempts to configure the system by cycling through all possible choices indicated for each circuit board and the order indicated in various function resource fields of the configuration files for each board. The present invention displays the results of the configuration attempt. If the configuration si unsuccessful, the present invention will display a failure message and the reason for such failure, for instance, a conflict in assigned resources. If the configuration attempt is successful, the present invention will so indicate and the operator may save the configuration setting. Further, the operator may view circuit board settings which may be revised as a result of the configuration process and use this information to physically set hardware elements on the circuit boards to be entered into the system.

It will be appreciated that the host system running the present invention may, in fact, be the computer system which is being configured. The operator may save the configuration, which includes a record of the circuit boards, functions, switch and jumper settings, software settings and resource assignments for the computer system, in permanent storage such that the configuration file is read each time the computer system is started up. Alternatively, where the host system is modeling the configuration for a different computer system, the present invention permits the operator to test various computer and circuit board combinations without having to obtain the physical systems and test the various configurations. In either instance, it will be appreciated that the present invention permits the user to configure a computer system and circuit boards, including setting hardware on the system and circuit boards, without reference to numerous computer system and circuit board reference manuals.

BRIEF DESCRIPTION OF THE DRAWINGS

A better understanding of the present invention can be had when the following detailed description of the preferred embodiment is considered in conjunction with the following drawings, in which:

FIG. 1 is a representation of a display screen showing illustrative computer systems which may be configured within the present invention;

FIG. 2 is a representation of a display screen showing a computer system and a circuit board listing;

FIG. 3 is a representation of a display screen showing a circuit board function list;

FIGS. 4A, 4B and 4C are block diagrams showing the relationship between display screen windows for the selection of circuit boards and their functions;

FIGS. 5A and 5B are representations of display screens showing the resources required by a circuit board and its effect on computer system memory allocation, respectively;

FIG. 6 is a representation of a display screen showing a computer system having existing circuit boards;

FIG. 7 is a representation of a display screen on the allocation of resources to a circuit board as a result of a configuration attempt;

DETAILED DESCRIPTION OF SPECIFIC EMBODIMENTS

A computer program operable on an ISA computer is described here to illustrate the invention.

Figure 11:
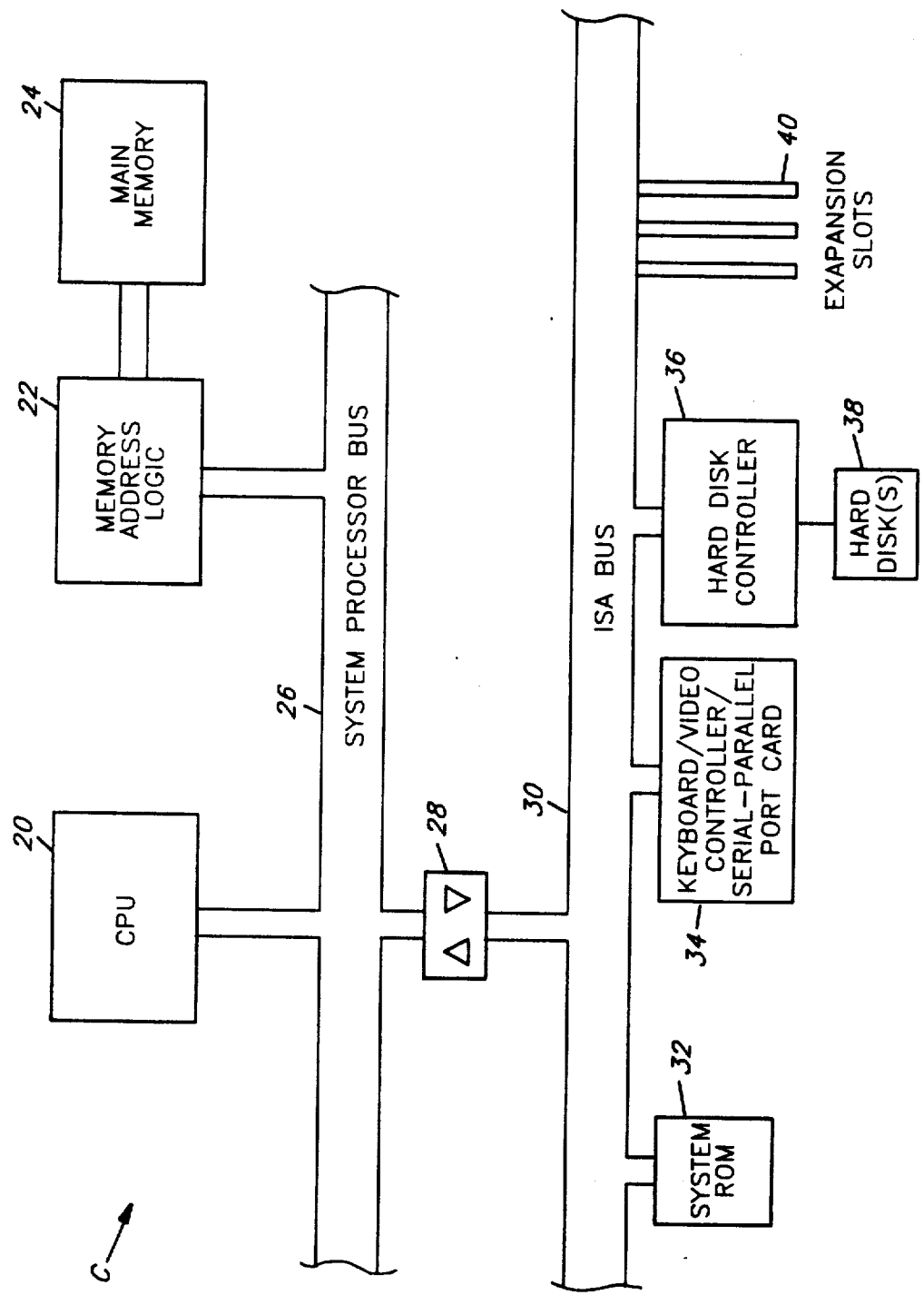
FIG. 11 is a block diagram of an illustrative computer system on which the method of the present invention may be practiced.

FIG. 11 is a simplified block representation of an illustrative ISA microcomputer on which the present invention may be practiced. The computer of FIG. 11 has been simplified to the extent that many elements of an ISA computer not relevant to the present invention are not represented in the diagram. Further, it will be appreciated that the computer of FIG. 11 is merely illustrative and that the method of the present invention may be practiced on other computers not described herein.

The computer system is generally referred to as C and includes a central processing unit 20 (CPU), a memory address logic controller 22 and dynamic random access memory 24 (DRAM). The CPU 20 and memory controller 22 are interfaced with the system processor bus 26 in the conventional manner. Memory 24 interfaces with the host bus 26 via memory controller 22. Other elements related to memory control circuitry, but not shown herein for the sake of simplicity, include data buffer circuitry and memory map logic.

System C also includes an industry standard architecture (ISA) bus 30, which includes transceivers 28 to interface between the ISA bus 30 and the system processor bus 26. The details of the portions of the system C illustrated in FIG. 11 and not discussed below are not significant to the present invention other than to illustrate an example of a fully configured computer system.

System read only memory circuits 32 (ROM), which contain basic operation software for the System C, are interfaced to the ISA bus 30. Also shown as being interfaced to the ISA bus 30 are a multifunctional circuit 34 and a hard disk controller 36. These circuit boards 34 and 36 may exist as part of a dedicated chip set mounted on the system board or as individual circuit boards. Where these functions are carried out by individual circuit boards, the respective circuit boards 34 and 36 are interfaced with the ISA bus 30 in the conventional manner by placing the boards into selected computer system slots 40. The hard disk controller 36 is shown as supporting a hard disk 38. It will be appreciated that the hard disk 38 may in fact represent multiple hard disks. A series of expansion slots 40 are shown as being interfaced with the ISA bus in the conventional manner. The expansion slots 40 may be used to add circuit boards to the computer system C to permit it to provide for communications capability, additional memory or other functions.

The preferred embodiment of the present invention operates as a computer applications program running on a computer system, such as that depicted in FIG. 11.

The preferred embodiment is invoked as an applications program in the conventional manner by the operator. The preferred embodiment presents the operator with a series of menus which require the operator to make certain selections. Based upon these selections, the preferred embodiment instructs the processor 20 to take various actions. FIGS. 12-16 are flow diagrams of the operation of the preferred embodiment. In order to best illustrate the preferred embodiment, FIGS. 12-16 will be discussed prior to a discussion of the screen displays of FIGS. 1-11.

Figure 12:
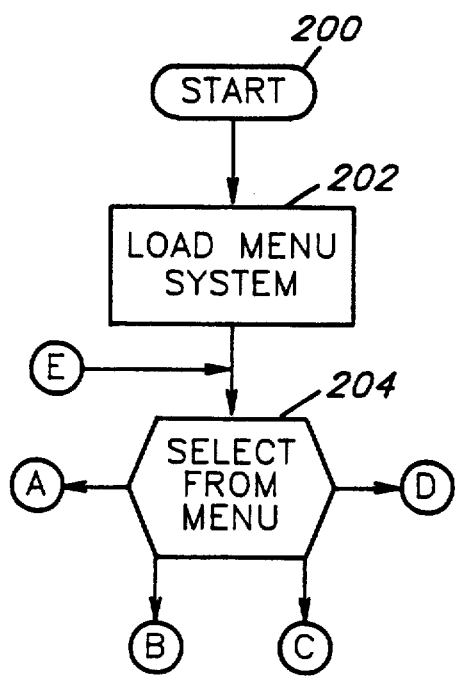
FIGS. 12, 13A, 13B, 14A, 14B, 15 and 16 are flow diagrams of the operation of the present invention.

Referring now to FIG. 12, operation of the preferred embodiment begins with the operator initiating the preferred embodiment on the host system of FIG. 11. Control of processor 20 transfers to step 202, wherein the processor 20 loads the interface of the preferred embodiment. Control of processor 20 transfers to step 204, wherein the operator selects from one of four functional choices. These functions are referred to by connectors A-D with a return connector E which leads back into step 204. These functional choices include: FILES, VIEW, CONFIGURE and INVENTORY. Each of these choices will be discussed in subsequent figures.

Figure 13A:
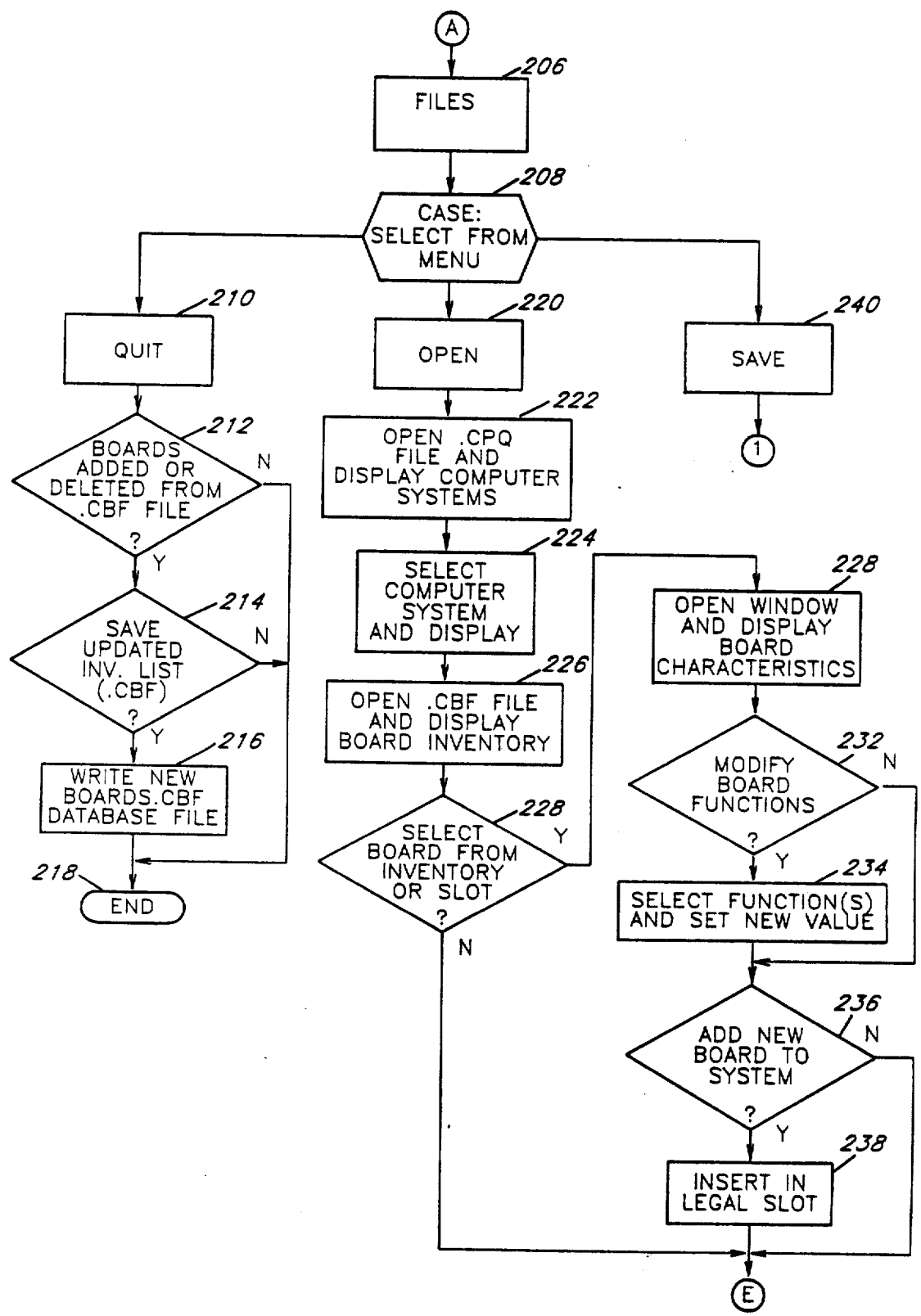
Figure 13B:
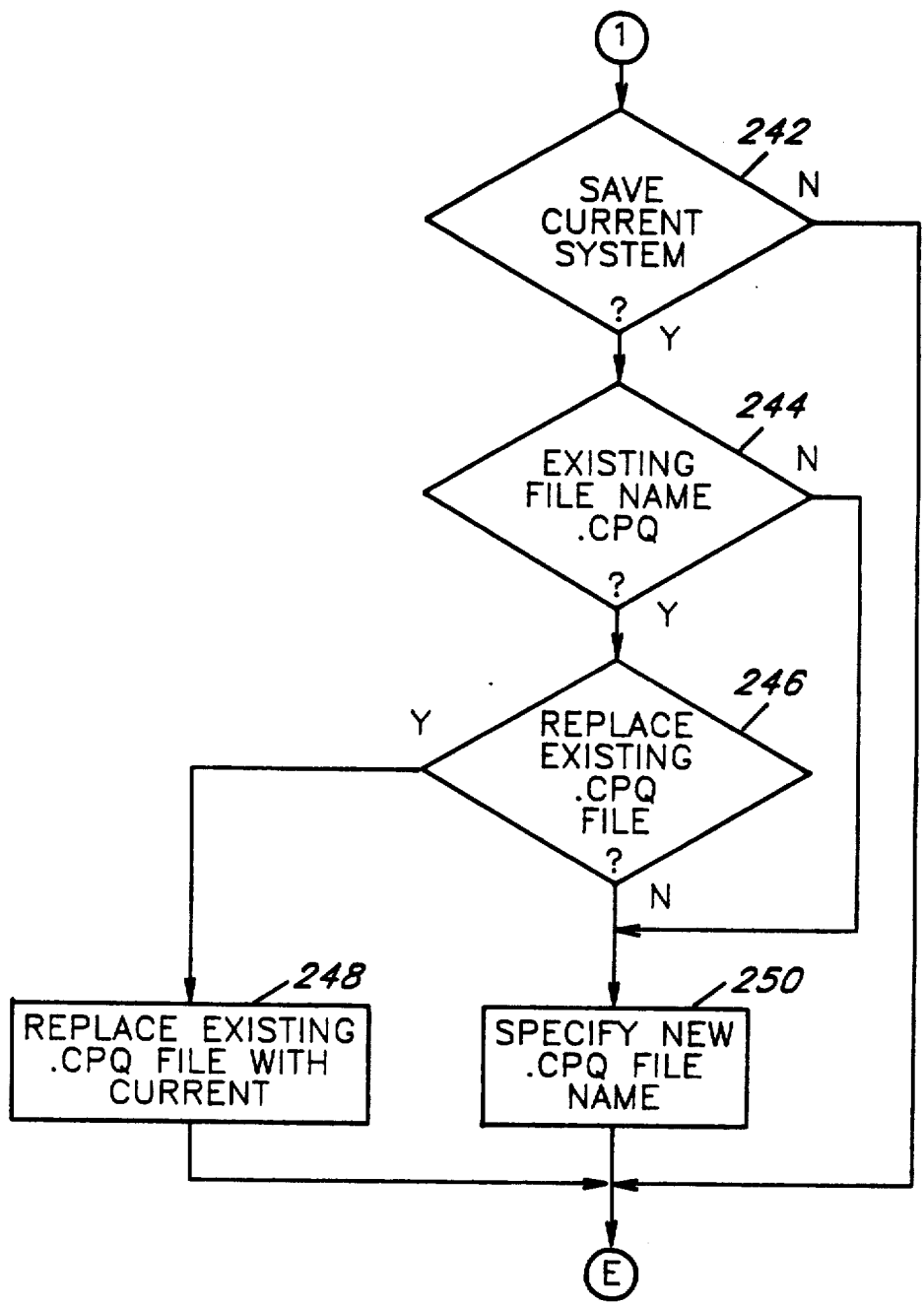

If in step 204, the operator selects the FILES choice, control of processor 20 transfers to FIG. 13, step 206. Upon choosing the files function, the preferred embodiment displays a submenu of three choices: QUIT, OPEN, and SAVE. If the operator selects the QUIT choice, control of the processor 20 transfers to step 210. Control of processor 20 thereafter transfers to step 212, wherein the preferred embodiment determines whether the operator has previously added a new circuit board file (.CBF file) to the circuit board data base file or has marked boards to be deleted from the circuit board database. A discussion of the addition or deletion of circuit boards will appear in the discussion in FIG. 16. Further, it will be appreciated that the circuit board database is not synonymous with the configuration files for a computer system. The steps necessary to save a configuration file for a computer system and installed boards will be discussed under the SAVE function in FIG. 13. If the operator has added boards or marked boards to be deleted from the circuit board database, control of processor 20 transfers to step 214, wherein the preferred embodiment prompts the operator to indicate whether the updated circuit board database, including the new or deleted .CBF files, is to be saved. If the operator selects the updated circuit board file to be saved, control of processor 20 transfers to step 216, wherein the processor 20 writes the new circuit board database to hard disk 38 or any other suitable permanent read/write storage. Control of processor 20 transfers to step 218, which ends the operation of the preferred embodiment. If in step 212, the preferred embodiment determines that no circuit boards have been added or marked for deletion from the circuit board inventory database, control of processor 20 transfers to step 218. If in step 214 the operator decides that the updated circuit board database inventory is not to be saved, control transfers to step 218.

If in step 208, the operator selects the subchoice OPEN, control of processor 20 transfers to step 220. Control of processor 20 thereafter transfers to step 222, wherein the preferred embodiment instructs the processor 20 to open a computer system database (.CPQ database) and display all computer systems which have been described within the database. (See FIG. 1, Available Systems Window 1000). It will be appreciated that in some instances, the only computer system which will be defined within the .CPQ database will be the computer on which the preferred embodiment of the present invention is being practiced. Where the preferred embodiment is being used to model the configuration of other computer systems and circuit boards. In such instance the operator will require that the additional systems be described in accordance with Appendix 1.

Control of processor 20 transfers to step 224, wherein the operator may view the list of computer systems described in the .CPQ database and select a computer system for operation within the preferred embodiment. Control of processor 20 transfers to step 226, wherein the preferred embodiment automatically opens the .CBF database and displays the board inventory. (See FIG. 2, Boards Inventory window 1004). Control of processor 20 transfers to step 228, wherein the operator may select a specific board from the inventory. If the operator selects a specific board from the inventory, control of processor 20 transfers to step 230, wherein the processor 20 opens a pull down window and displays the characteristics for the selected board. (See FIG. 3, In-Hand window 1010). Control of processor 20 transfers to step 232, wherein the operator may modify board functions. It will be appreciated that circuit boards of current design are often capable of carrying out more than one function. Therefore, it is not unusual for a circuit board to handle both hard disk and floppy disk control functions while providing both a serial and a parallel output port for the computer system into which the circuit board is installed.

If in step 232, the operator decides to modify board functions, control of processor 20 transfers to step 234, wherein the operator specifies functions to be activated for the circuit boards. (See FIGS. 4A-4C, Board Inventory window 1004, In-Hand window 1010 and Board Detail window 1012, showing parallel communications port detail). Control of processor 20 transfers to step 236, wherein the preferred embodiment prompts the operator as to whether the selected board is to be added to the selected computer system. If the operator chooses to add the board to the computer system, control of processor 20 transfers to step 238, wherein the preferred embodiment will assign or insert the board into the first legal slot. The preferred embodiment will first attempt to assign 8 bit boards in eight bit slots; a 16 bit boards in 16 bit slots and a 32 bit board be placed in a 32 bit slot. If there are no open slots for the specified size, the preferred embodiment will attempt to install the board in a larger size slot. It is well known to one skilled in the art that an 8-bit ISA board may be installed in a 16 bit slot and a 16-bit board may be installed in a 32 bit slot. However, it will be appreciated that this type of slot allocation does not represent the ideal allocation of slots in the configuration process.

Following the insertion of the board into the first legal slot in step 238, control of processor 20 transfers to connector E which returns the control the preferred embodiment back to FIG. 12 step 204. If in step 228, the operator decides not to select a board from the inventory, control of processor 20 transfers to connector E which returns control of the preferred embodiment to FIG. 12, step 204. If in step 232, the operator decides not to modify board functions, control of processor 20 transfers to step 236, wherein the preferred embodiment permits the operator to add the selected board to the system.

If in step 208, the operator selects the subchoice SAVE, control of the preferred embodiment transfers to step 240. Control of processor 20 thereafter transfers to step 242, wherein the operator is prompted as to whether to save the current system. If the operator selects to save the current computer system configuration, control of processor 20 transfers to step 242, wherein the preferred embodiment determines whether the current system .CPQ file name already exists in the .CPQ database. This situation would occur when a system has been selected from the computer system database and subsequently modified by the operator. If the file exists in the .CPQ database, control of processor 20 transfers to step 246, wherein the preferred embodiment prompts the operator as to whether to replace the existing .CPQ file of the same name. If the current system is to be saved using the same .CPQ file name, control of processor 20 transfers to step 248, wherein the preferred embodiment replaces existing .CPQ file with the current .CPQ file. Control of processor 20 thereafter transfers to connector E. If in step 242, the operator chooses not save the current system, control of processor 20 transfers to connector E. If in step 244, the preferred embodiment determines that there is no existing or conflicting .CPQ file name in the database, control of processor 20 transfers to step 250, wherein the preferred embodiment prompts the operator to specify a new .CPQ file name for addition to the .CPQ database. The preferred embodiment then adds the new configuration file to the database. Control of processor 20 thereafter transfers to connector E.

Figure 14A:
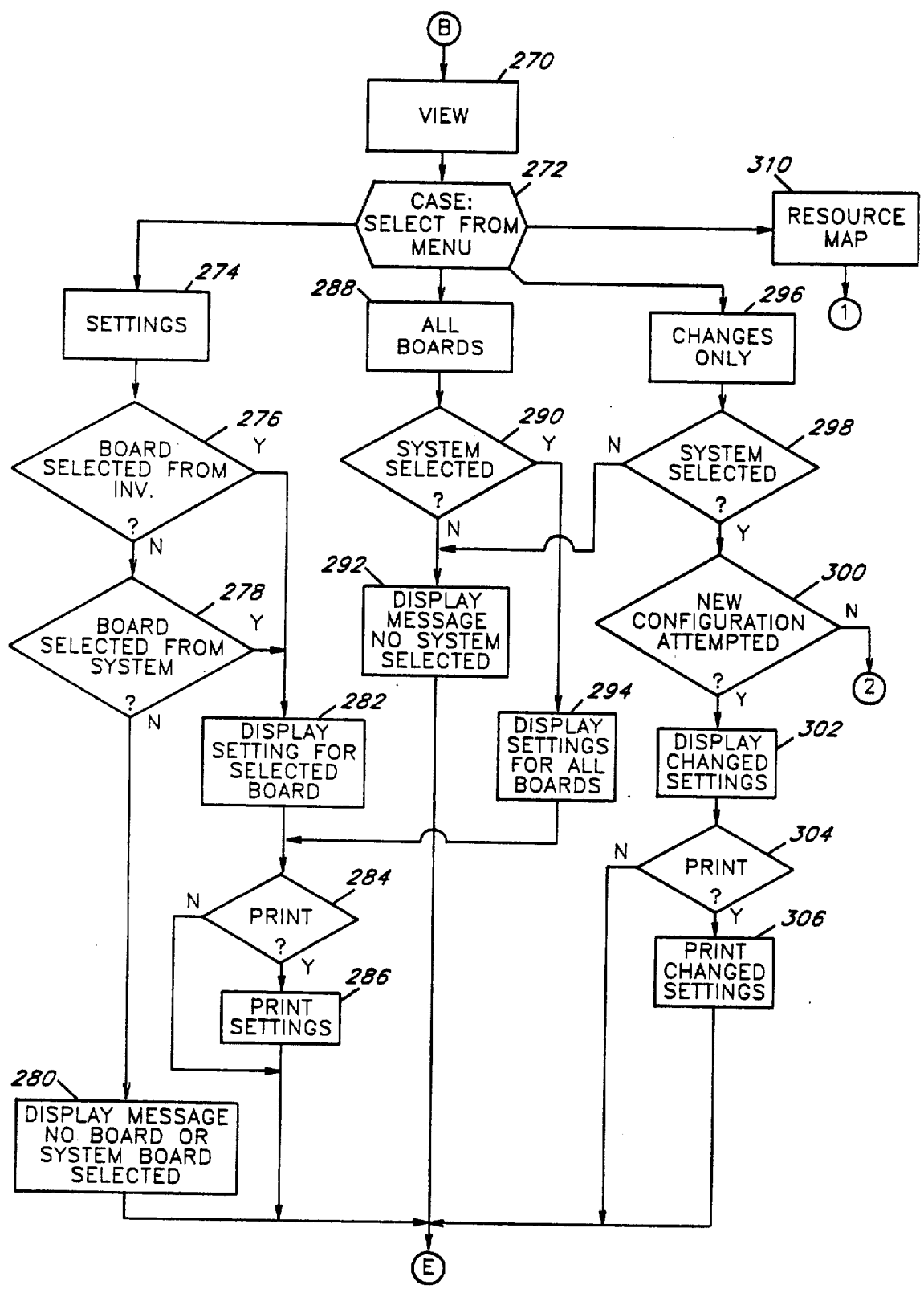
Figure 14B:
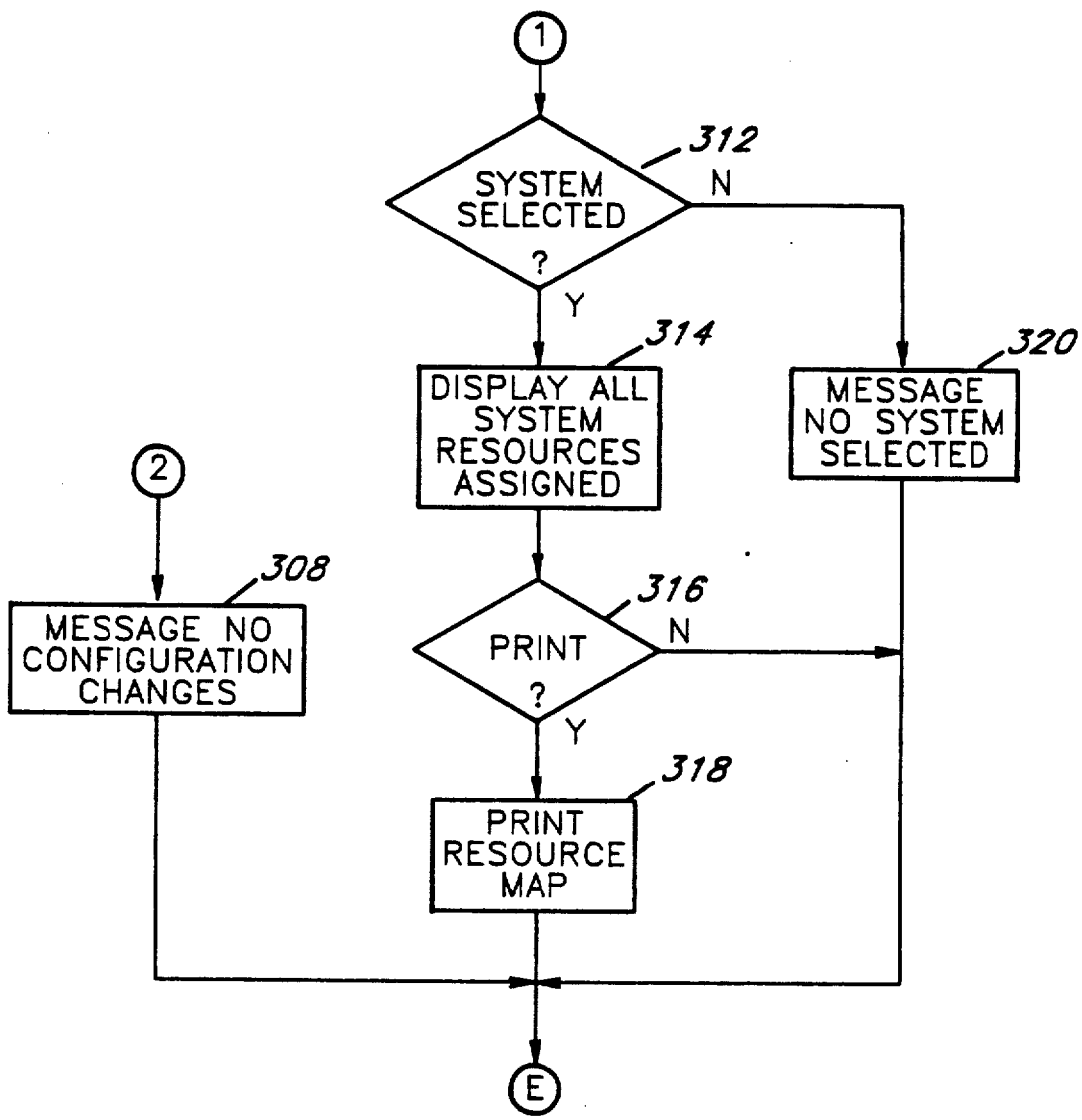

If in FIG. 12 step 204, the operator selects the VIEW function, control of processor 20 transfers to FIG. 14 step 270. Control of processor 20 transfers to step 272, wherein the preferred embodiment causes a sub-menu to be displayed. If in step 272, the operator selects the SETTINGS subchoice, control of processor 20 transfers to step 274. Control of processor 20 thereafter transfers to step 276, wherein the preferred embodiment determines whether a circuit board has been selected from inventory database. If a board has not been selected from inventory, control of processor 20 transfers to step 278, wherein the preferred embodiment determines whether the operator has selected a board which has been inserted into the selected computer system has been chosen for review. If no board from the selected computer system has been chosen, control transfers to step 280, wherein the preferred embodiment displays a message that no circuit board in the In-Hand window (FIG. 3, 1010) or circuit board inserted in the selected system has been selected for viewing or settings. Control of processor 20 thereafter transfers to connector E. If in step 276, the preferred embodiment determines that a circuit board has been selected from the inventory list, control of processor 20 transfers to step 282, wherein the preferred embodiment displays the hardware settings required for the initialization and allocation of resources for the selected board.

These settings include jumper positions, dual in-line pole switch settings and other hardware elements on the circuit board. Control of processor 20 thereafter transfers to step 284, wherein the preferred embodiment prompts the operator as to whether the settings for the selected board are to be printed. If the operator requests the settings for the selected to be printed, control of processor 20 transfers to step 286, wherein the preferred embodiment prints the settings in a conventional file format for a printer attached to the ISA bus 30, FIG. 11

(not shown). Control of processor 20 thereafter transfers to connector E. If in step 284 the operator selects not to print the settings, control of processor 20 transfers to connector E.

If in step 272, the operator selects the ALL BOARDS option, control of processor 20 transfers to step 288. Control of processor 20 thereafter transfers to step 290, wherein the preferred embodiment determines whether a computer system has been selected from the .CPQ database. If no system has been selected from the .CPQ database, control of processor 20 transfers to step 292, wherein the preferred embodiment displays a message that no system has been selected. Control of processor 20 thereafter transfers to connector E. If in step 290 the preferred embodiment determines that a computer system has been selected from the .CPQ database, control of processor 20 transfers to step 294, wherein the preferred embodiment displays the settings for ALL BOARDS which have been inserted into the selected computer system. Control of processor 20 transfers to step 284, wherein the operator is given the option of printing the settings for all boards inserted in the selected computer system.

If in step 272, the operator selects the CHANGES ONLY subchoice, control of processor 20 transfers to step 296. Control of processor 20 thereafter transfers to step 298, wherein the preferred embodiment determines whether a computer system has been selected from the .CPQ database by the operator. If no system has been selected by the operator, control of processor 20 transfers to step 292. If a system has been selected from the .CPQ database, control of processor 20 transfers to step 300. In step 300, the preferred embodiment determines whether a new configuration for the selected computer system has been attempted. If no configuration has been attempted for the selected computer system, control of processor 20 transfers to step 308, wherein the preferred embodiment displays a message indicating no configuration changes. Control of processor 20 thereafter transfers to connector E. If in step 300 the preferred embodiment determines that a new configuration has been attempted, control of processor 20 transfers to step 302, which displays the settings for those circuit boards which were changed as a result of the configuration attempt. Control of processor 20 transfers to step 304, wherein the operator is given the option of printing the changed settings. If the operator chooses to print the changed settings, control of processor 20 transfers to step 306, which prints the changed settings. Control of processor 20 thereafter transfers to connector E. If in step 304, the operator chooses not to print the changed settings, control of processor 20 transfers to connector E.

If in step 272 the operator selects the RESOURCE MAP subchoice, control of processor 20 transfers to step 310. Control of processor 20 thereafter transfers to step 3132, wherein the preferred embodiment determines whether the operator has selected a computer system from the .CPQ database. If a system has been selected, control of processor 20 transfers to step 314, wherein the preferred embodiment displays all system resources assigned and all functions activated for each board which has been inserted into the selected computer system (See FIG. 7, Trial Configuration window 1014). Control of processor 20 thereafter transfers to step 316, wherein the preferred embodiment gives the operator the option to print the resource map for the selected system. If the operator chooses to print the system resource map, control of processor 20 transfers to step 318, wherein the preferred embodiment prints the resource map. Control of processor 20 thereafter transfers to connector E. If in step 312 it is determined that no system has been selected from the .CPQ database, control of processor 20 transfers to step 320, wherein the preferred embodiment displays a message indicating that no system has been selected. Control of processor 20 thereafter transfers to connector E. If in step 316 the operator chooses not to print the resource map for the selected computer system and boards inserted therein, control of processor 20 transfers to connector E.

Figure 15:
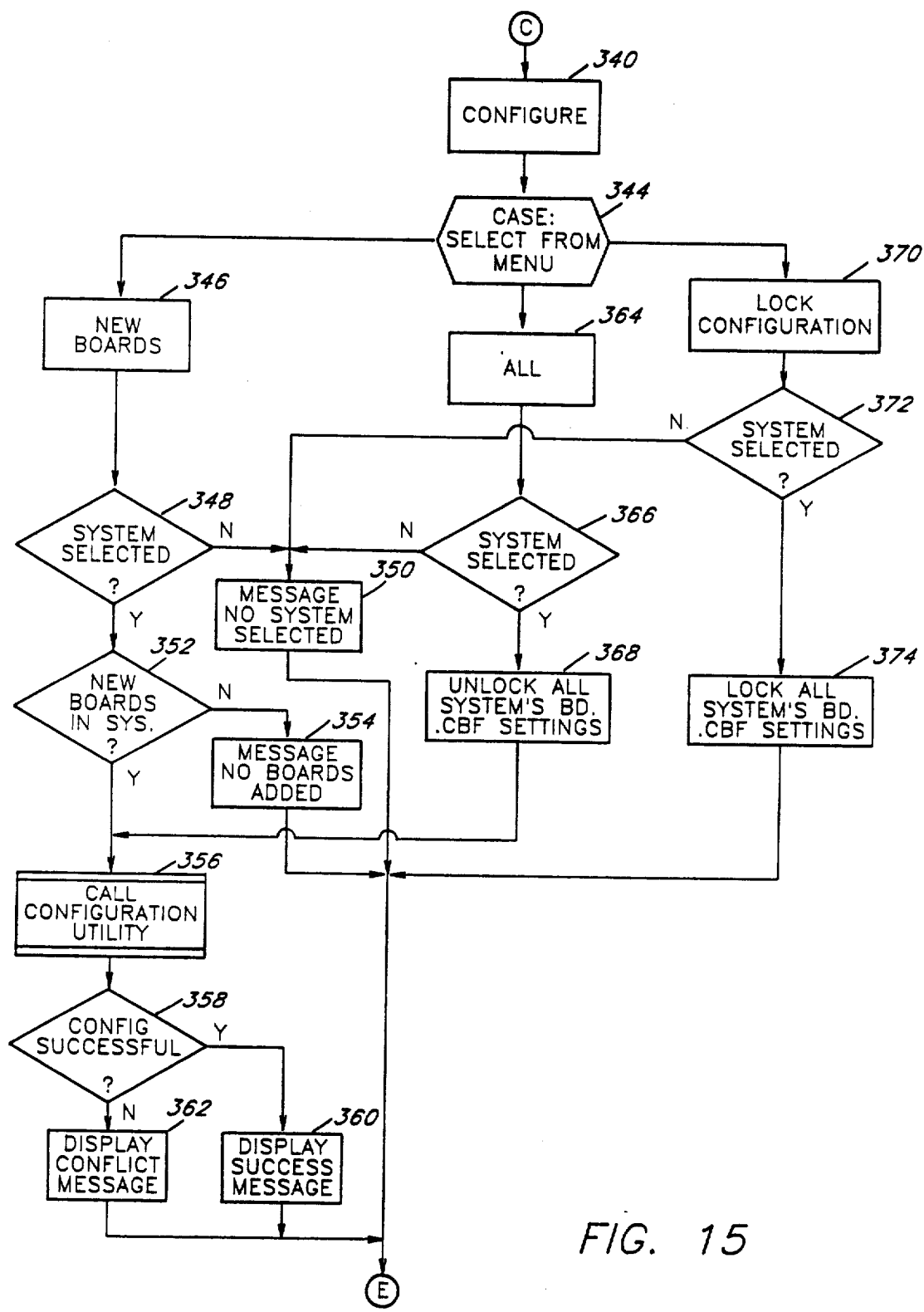

If in FIG. 12, the operator selects the CONFIGURE choice, control of processor 20 transfers to FIG. 15 step 340. Thereafter control of processor 20 transfers to step 344, wherein the preferred embodiment displays subchoices for the CONFIGURATION menu. If in step 344 the operator chooses the subchoice NEW BOARDS, control of processor 20 transfers to step 346. Control of processor 20 thereafter transfers to step 348, wherein the preferred embodiment determines whether a computer system has been selected from the .CPQ database. If no system has been selected from the .CPQ database, control of processor 20 transfers to step 350, wherein the preferred embodiment displays a message indicating that no system has been selected. Control of processor 20 thereafter transfers to connector E.

If in step 348 the preferred embodiment determines that a computer system has been selected from the .CPQ database, control of processor 20 transfers to step 352. In step 352, the preferred embodiment determines whether new boards have been added to the selected computer system as indicated in FIG. 13 steps 236-238. This may readily be determined by comparing current slot occupancy with the prior slot occupancy information contained within the .CPQ file for the selected computer system. If new boards have ben inserted into the system, control of processor 20 transfers to step 356, which calls the CONFIGURATION utility subroutine, which will be explained in further detail below. Upon return from the CONFIGURATION utility, control of processor 20 transfers to step 358, wherein the preferred embodiment determines whether the configuration was successful, that is, all boards with their activated functions were assigned nonconflicting resources. If the configuration was successful, control of processor 20 transfers to step 360, wherein the preferred embodiment displays a configuration successful message. Control of processor 20 thereafter transfers to connector E. If in step 358 it is determined that the configuration attempt was not successful, control of processor 20 transfers to step 362, wherein the preferred embodiment displays a configuration failure message and indicates where resource conflict occurred between one or more boards. (See FIG. 8, window 1016). Control of processor 20 thereafter transfers to connector E.

If in step 344, the operator selects the ALL Subchoice, control of processor 20 transfers to step 364. Control of processor 20 thereafter transfers to step 366, wherein the preferred embodiment determines whether a computer system has been selected from the .CPQ database for the configuration. If no system has been selected for the configuration, control of processor 20 transfers to step 350. If a system has been selected for configuration, control of processor 20 transfers to step 368, wherein the preferred embodiment unlocks the current computer system's circuit board settings in their respective .CBF files. This permits the preferred embodiment to assign alternate resources to all circuit boards as required to achieve a nonconflicting configuration, as opposed to investigating alternatives only for newly added boards as in the NEW BOARDS subchoice. Control of processor 20 then transfers to step 356.

If in step 344, the operator selects the LOCK configuration subchoice, control of processor 20 transfers to step 370. Control of processor 20 thereafter transfers to step 372, wherein the preferred embodiment determines whether there is a selected computer system. If a computer system has not been selected, control of processor 20 transfers to step 350. If in step 372 the preferred embodiment determines that a computer has been selected, control of processor 20 transfers to step 374. In step 374 the preferred embodiment will modify all of the system's currently installed circuit board files by modifying the .CBF file for each circuit board, thereby locking the board resource assignments and settings. When the .CBF files for the circuit boards are locked, the preferred embodiment may not change those assignments during subsequent addition of other circuit boards without going through the CONFIGURE ALL subchoice of FIG. 15. Control of processor 20 thereafter transfers to connector E.

Figure 16:
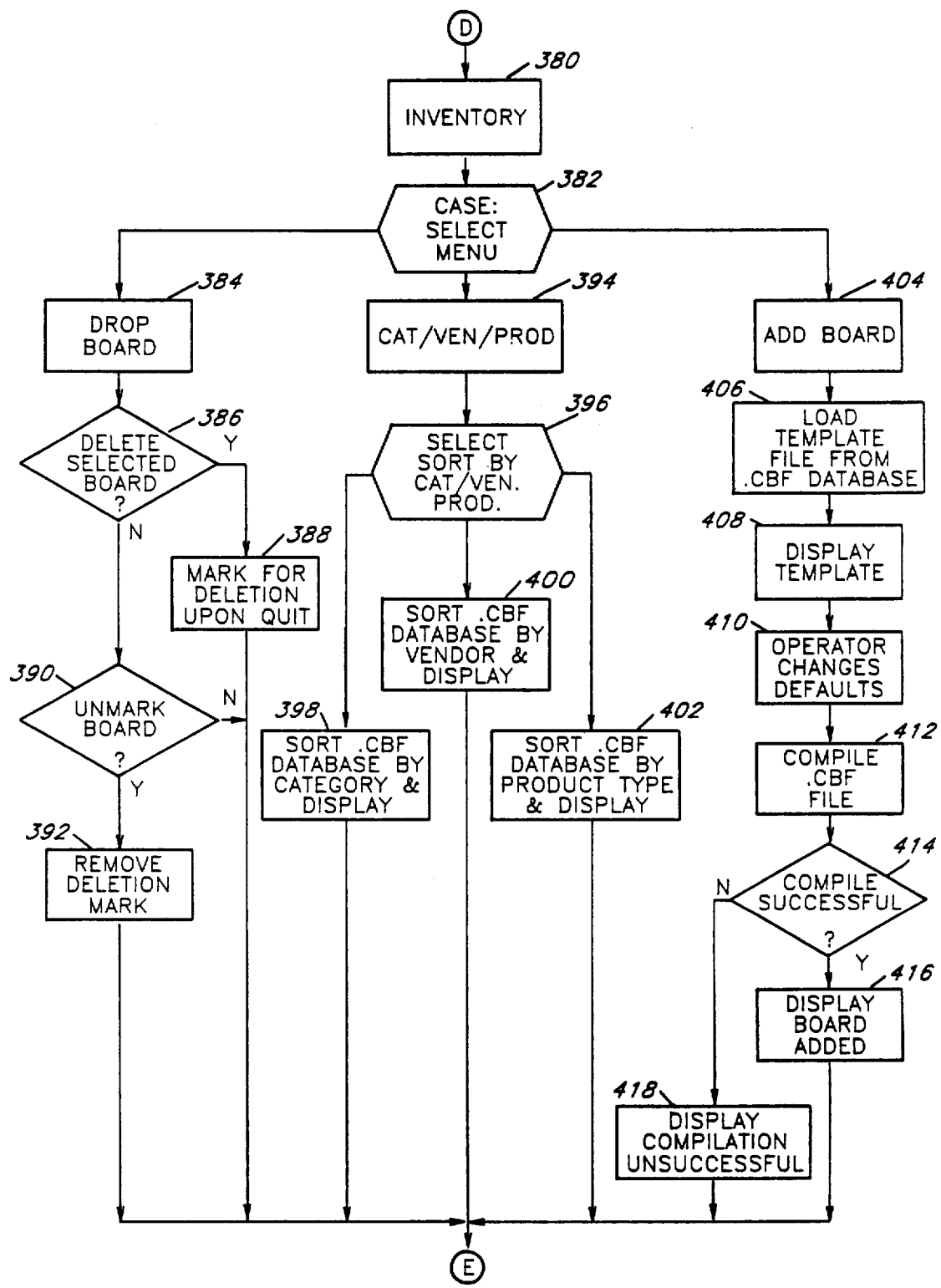

If in step 204 the operator selects the INVENTORY subchoice, control of processor 20 transfers to FIG. 16, step 380. Control of processor 20 thereafter transfers to step 382, wherein the preferred embodiment displays a series of subchoices as a menu. If the operator chooses to DROP a board, that is, to delete a board description from the inventory listing, control of processor 20 transfers to step 384. Control of processor 20 thereafter transfers to step 386, wherein the operator is given the option to mark a board in the inventory listing to be deleted upon exit from the program of the preferred embodiment. If the operator chooses to delete a board, control of processor 20 transfers to step 388, wherein the operator marks a board for deletion within the inventory listing through a series of conventional key strokes to indicate the board is to be deleted. Control of processor 20 thereafter transfers to connector E. If in step 386 operator decides not to delete any boards from the inventory listing which have been previously marked for deletion, control of processor 20 transfers to step 390, wherein the operator is given the option to unmark a board for deletion. If the operator does not wish to unmark a board for deletion, control of processor 20 transfers to connector E. If the operator wishes to unmark a board for deletion, control of processor 20 transfers to step 392, wherein the operator removes the deletion mark through a series of conventional key strokes. Control of processor 20 thereafter transfers to connector E. The actual deletion of a board from inventory occurs upon exit of the preferred embodiment (See FIG. 13, steps 212-216).

If in step 382 the operator selects the CATEGORY/VENDOR/PRODUCT option, control of processor 20 transfers to step 394. Control of processor 20 thereafter transfers to step 396, wherein the preferred embodiment presents the operator with three additional sub-choices. By selecting any one of the subchoices, the operator may sort the board inventory listing by the category or function the board serves; the board vendor; or specific name. If in step 396 the operator selects the CATEGORY sub-choice, control of processor 20 transfers to step 398, wherein the preferred embodiment sorts the board inventory display by board category and redisplays the board inventory listing. Control thereafter transfers to connector E. If in step 396 the operator selects the VENDOR option, control of processor 20 transfers to step 400, wherein the preferred embodiment sorts the board inventory display based on vendor and redisplays board inventory file. Control of processor 20 thereafter transfers to connector E. If in step 396 the operator selects to sort the board inventory file by PRODUCT TYPE, control of processor 20 transfers to step 402, wherein the preferred embodiment will sort the board inventory display by product name and redisplay the board inventory listing. Control of processor 20 thereafter transfers to connector E.

If in step 382 the operator selects the ADD BOARD option, control of processor 20 transfers to step 404. Control of processor 20 thereafter transfers to step 406, wherein the preferred embodiment searches the board database to load a template file from the database. The template file is used to create a new board file in an interactive manner within the preferred embodiment. Control of processor 20 transfers to step 408, wherein the preferred embodiment displays the circuit board template. Control of processor 20 transfers to step 410, wherein the operator customizes the template to reflect the particular circuit board being added to the inventor listing. The operator may specify the name, the function, the size and type of slot required by the board as well as any necessary settings. Control of processor 20 thereafter transfers to step 412, wherein the operator instructs the preferred embodiment to compile the modified circuit board template. The compilation results in a binary .CBF file. Control of processor 20 transfers to step 414, wherein the preferred embodiment determines whether the compilation was successful. If the compilation was successful, control of processor 20 transfers to step 416, wherein the preferred embodiment displays a message indicating that the board .CBF file was successfully created and marks the board file to be added to the board database upon exit from the preferred embodiment. Control of processor 20 thereafter transfers to connector E. If in step 414 the preferred embodiment determines that the compilation was unsuccessful, control of processor 20 transfers to step 418, wherein the preferred embodiment displays a compilation unsuccessful message. Control of processor 20 thereafter transfers to connector E. It will be appreciated that the operator by reentering the inventory subchoice menu may make modifications to the edited template to permit further description of the board.

The interface of the preferred embodiment operates as a series of windows or screens having pull-down menus which permit the user to select options as a series of keystrokes. FIGS. 1-10, are representations of a screen displays seen by an operator of the preferred embodiment. Referring specifically to FIG. 3, the basic screen interface includes a top menu bar 1006, a series of windows 1002, 1004, 1010 and a control bar 1008, which is similar to pull-down menus commonly used in computer applications software such as Microsoft Windows. The top menu area 1006 sets forth the specific functions within the preferred embodiment: FILE, VIEW, CONFIGURE and INVENTORY. This is the choice presented the operator in FIG. 12, step 204. The operator may select any one of the functions using various key strokes.

It will be appreciated that means for scrolling or selecting various functions or choices within the preferred embodiment may be accomplished through a varying series of keystrokes. The specific keystrokes used to scroll, select or initiate functions within the preferred embodiment are not critical to the operation of the preferred embodiment, as various means of selecting choices from hierarchical menus using a keyboard and screen is well known in the art.

The pull-down window area is used to list various choices or operations for the selected function. The pull down-windows 1002, 1004, 1010 operate as a set of hierarchical choices which are specific to each function. The bottom control menu 1008 area operates as a prompt area which instructs the operator as to various functions which may be carried out in each function.

The preferred embodiment utilizes a database which contains a series of files used to describe various computer systems and circuit boards. The computer systems and circuit boards are described in a consistent format, as described in Appendix 1, Functional Specification: Extended ISA Configuration Language for ISA Boards and Appendix 2: BDADD.EXE Version 1.00 Specification, Compaq Computer Corporation, Jan. 5, 1989. The database files may be organized in any suitable manner and may be stored on the host system for the preferred embodiment (FIG. 11) or any other suitable read/write mass storage media.

Computer systems are described in system files, known as .CPQ files, which include information as to the amount of non-volatile memory 24 available in the computer system, the number of expansion slots available on the system board, the size and type of expansion slots and other physical parameters associated with the slot. Other parameters used to describe the computer system include the type of processor 20 and the nominal clock speed for the processor. The system configuration files also include comment areas set for the name and description of the computer system. FIG. 1 is a screen representation showing a listing of various computer systems and a specific selected system. A display of Available Systems window 1000 is obtained by selecting the FILES function and the subchoice OPEN, as reflected in the flow diagram, FIG. 13, step 220. The preferred embodiment will display all computer systems for which a .CPQ file has been created in the .CPQ database in the FIG. 1 Available Systems window 1000, described in FIG. 13, step 222. Each system has a specific .CPQ file name and a description. A .CPQ file may be selected from the listing using various keystrokes to move through the list and select the system of interest (FIG. 13, step 224). Only part of the file name is displayed, as all files include a .CPQ extension file name.

Figure 8:
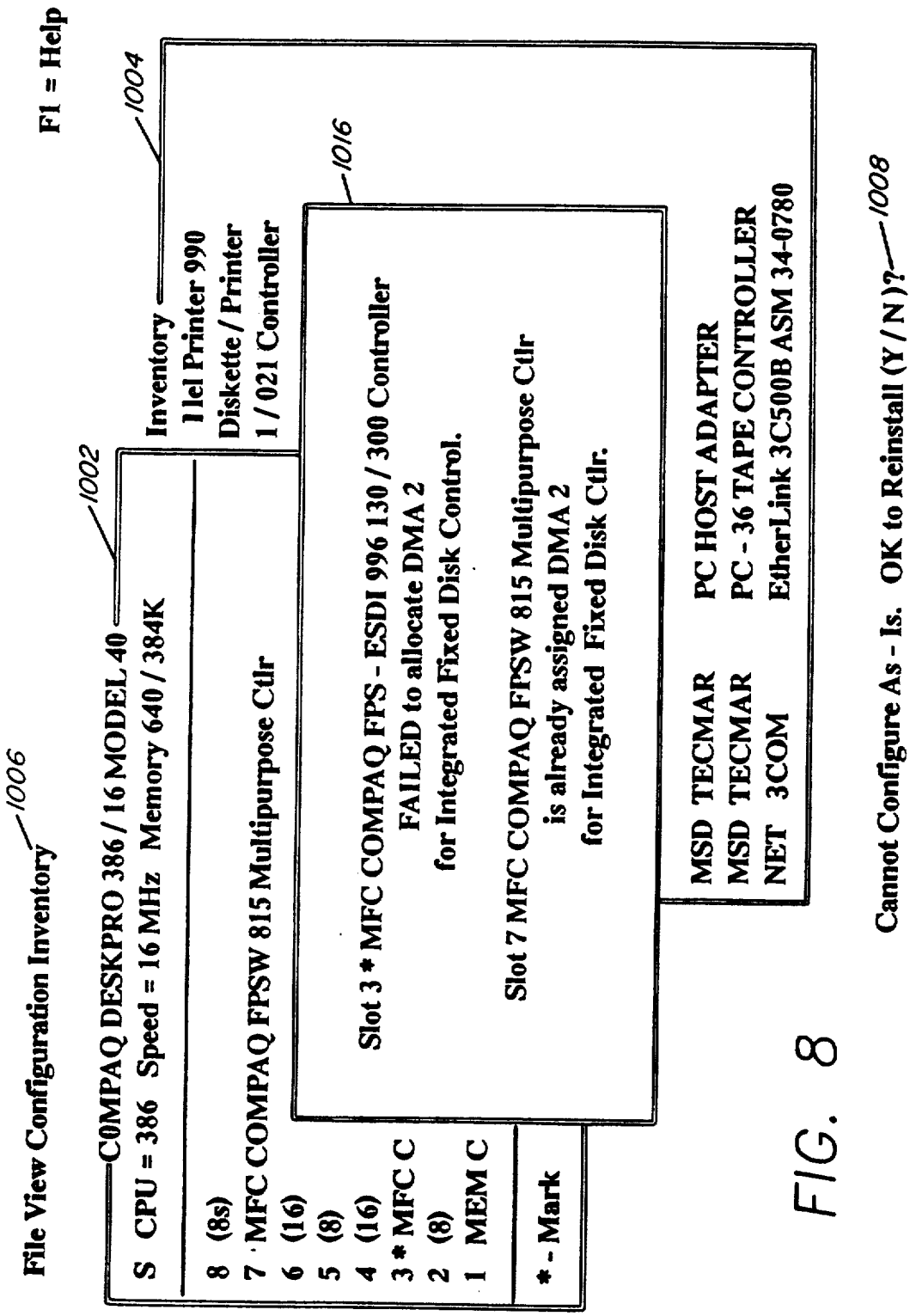
FIG. 8 is a representation of a display screen showing the results of a failed attempt to configure a computer system.

In FIG. 1, the file 3D16SM40.CPQ has been selected for inspection. This file is described in the Available Systems Window 1000 as a Compaq Computer Corporation Deskpro 386s Model 40 computer. Once the computer has been selected, the preferred embodiment will display specific information relating to the selected system (FIG. 1, window 1002). In FIG. 1, the 3D16SM40 file is opened to show that the selected system is a Deskpro 386s Model 40 having an Intel 80386 CPU running at nominal clock speed of 16 MHz. The amount of memory in the selected system is also displayed in FIG. 1 but is partially obscured. Referring to FIG. 8, window 1002, the information relating to the memory for a selected system may be seen. The reference in FIG. 8 of 640K/384K indicates as basic memory of 640 Kbytes and an extended memory of 384 Kbytes. Referring back to FIG. 1, the number and type of expansion slots for the selected computer system is displayed along with any slot occupancy (FIG. 1, window 1002).

In FIG. 1, the selected computer system is shown as having 5 open slots, each slot being a 16 bit slot, as indicated by the number 16 within the parentheses. All of the slots listed in FIG. 1 are shown as being unoccupied. Expansion slots of varying types are set forth in FIG. 6, window 1002. In FIG. 6, window 1002, the selected computer system, a Compaq Deskpro 386/16 Model 40, is shown as having 8 slots of three different types. Slot 1 is a 32 bit memory slot and is shown as being occupied by a memory board. Slots 2, 5 and 8 are designated as 8 bit slots, with slot 8 being designated as being bale to accommodate an 8 bit circuit board having a lower extension or skirt. None of the 8 bit slots are shown as being occupied in FIG. 6. Slots 3, 4, 6 and 7 are designated as 16 bit slots, with slot 7 being occupied by a 16 bit circuit board, the Compaq FPSW 815 Multipurpose Controller.

It will be appreciated that the preferred embodiment is capable of displaying computer system information related to generic computer systems, such as that displayed in FIG. 1, or computer systems which already have circuit boards, such as FIG. 6, to assist in the configuration of the selected computer system.

Referring now to FIG. 2, following the selection of a computer system for configuration, the preferred embodiment displays a listing of circuit boards which have been described in the Boards Inventory window 1004 (FIG. 13, step 226). Circuit boards in the preferred embodiment are described according to Appendix 1 as files having a .CBF file extension. A standard board which appears in the inventory listing is described as a board .CBF file within the preferred embodiment. The listing displays the general type of circuit board, its manufacturer and the function of the circuit board. For instance, the IBM Serial/Parallel Adapter Card of FIG. 2, window 1002, is described as an MFC or multi-function board. The specific categories of boards in the preferred embodiment are set forth in Appendix 1. The operator may select one or more of the boards in the listing to vie the board characteristics or to use it as part of the configuration process.

Referring to FIG. 3, the operator may select a circuit board from the listing by way of various keystrokes and view circuit board characteristics. (FIG. 13, step 228). The In-Hand window 1010 of FIG. 3 displays the detail for the selected board, a multifunction Compaq FPSW 36 Multi-Purpose Controller Board. The In-Hand Window 1010 is opened following the selection of a specific circuit board from the Board Inventory window listing 1004. (FIG. 13, step 230). The selected board is defined in accordance with the specification language set forth in Appendix 1, Sections 5 and 6. The board in FIG. 3, window 1010 is described as a 16 bit multi-function circuit board, including a fixed disk controller, a floppy disk controller and providing for a serial and a parallel port.

Many of the circuit boards manufactured for personal computers serve multiple functions. Each of the functions for a specific board may also be inspected within the preferred embodiment. This is accomplished by selecting one of the board functions listed in the In-Hand window 1010 and requesting by various keystrokes that the preferred embodiment display detailed information for the specific function (FIG. 14, step 232). FIG. 4 shows the relationship of the various menus for a selected board, and its function choices. In FIG. 4, a multi-function board, the MFC COMPAQ FPSW Board, is displayed as being selected in FIG. 4A Board Inventory Window 1004. Having been selected, the description of the selected board appears in FIG. 4B In-Hand window 1010, along with the available slots and functions on the board. A particular function may be selected and viewed through a series of keystrokes and viewed in the Board Detail window FIG. 4C, window 1012. In FIG. 4B, the parallel communications port function is selected and the choices associated with the function are displayed. In FIG. 4C, the Board Detail window 1012 displays information related to the parallel communications port and the choices, LPT1, LPT2, LPT3 and DISABLE are displayed. The operator may select one of the choices listed in window 1012 and set that value for the circuit board during the configuration process (FIG. 13, step 234).

It will be appreciated that another board in an existing system may already be assigned port LPT1 and it may be necessary to chose another port designation. Alternatively, the operator may choose to disable the parallel port function for the selected card by choosing DISABLE. If no choice is made by the operator, the preferred embodiment will use the first listed choice, LPT1, as the default choice. It will be appreciated that other function choices for the board depicted in FIG. 6 may be made in a similar manner. The selections made under the function choices are utilized during the configuration attempt.

Additional Board Detail information may be obtained by scrolling through the Board Detail window 1012. In FIG. 5A window 1014, the Board Detail window for the board selected in FIGS. 4A-4C shows the parallel port function as requiring one IRQ value. It further indicates that the IRQ may be assigned one of three possible values and is currently assigned IRQ 7. Similarly, the port address is shown as having been set to 3 BCh. In FIG. 5B, the Board Detail window 1012 sets forth the specific memory address locations for the parallel printer port.

Once a circuit board has been selected and various functions selected, the operator may select it for incorporation in the selected computer system (FIG. 14, step 236). This may be referred to as insertion of the circuit board into the computer system to be configured. The operator may add the circuit board to the selected computer system through a series of keystrokes (FIG. 14, step 238). The preferred embodiment will add the circuit board to the first legal slot, i.e., an 8 bit card will be inserted into the first unoccupied 8 bit slot; a 16 bit card into the first unoccupied 16 bit slot, on a default basis. The operator may thereafter move the circuit board to any other available legal slot.

The operator may continue to add circuit boards to the selected system in the manner described in FIG. 13. As stated previously, the circuit boards may be added to the computer system running the preferred embodiment or the circuit boards may be added to a computer model or virtual system.

The selection and addition of circuit boards and their functions to the selected system does not guarantee that the boards will be capable of carrying out their assigned functions. Many of the circuit boards manufactured are assigned initial default values. These values may include memory address location, port assignments, interrupt request lines, DMA channels, and other computer resources necessary for the functioning of the circuit board within a computer system. Where default or factory set initial values conflict, circuit boards requiring nonconflicting resources will be unable to carry out their various functions. Similarly, the addition of a new circuit board to an existing configured computer system having circuit boards already installed may give rise to conflict in computer resource assignment. Thus, it becomes necessary for the operator to set the necessary hardware, e.g., switches and jumpers, to enable these functions on the circuit boards.

The preferred embodiment allows the operator to review the settings for various circuit boards within a selected computer system. These settings are hardware or software selections for each circuit board which control the initial values for the circuit boards and the assignment of common computer resources during the configuration process. The hardware selections may include jumpers, rotary switches, DIP switches or other means of setting initial values and resource assignments for a circuit board. These settings may be the result of a prior configuration, selection or disabling of various functions or simply the default values set by the circuit board manufacturer. It will be appreciated that the proper selection and setting of the various hardware elements for each circuit board in a system is a time-consuming process which generally requires review of one or more circuit board reference manuals or drawings.

Figure 9:
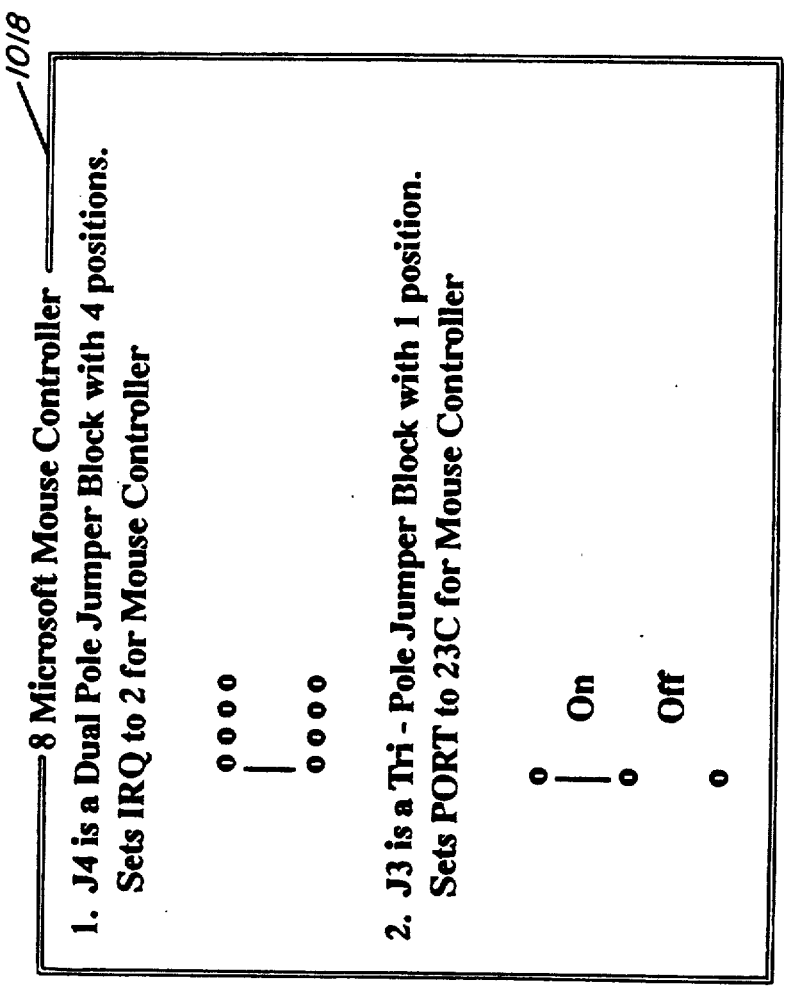
FIG. 9 is a representation of a display screen showing typical jumper settings required to initialize a circuit board.
Figure 10A:
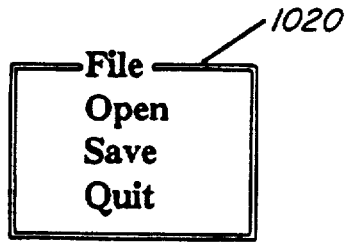
FIGS. 10A, 10B, 10C and 10D are diagrams showing the menu structures of the present invention.
Figure 10B:
Figure 10C:
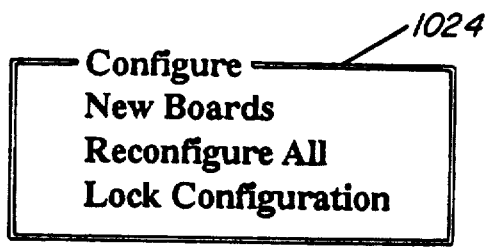
Figure 10D:
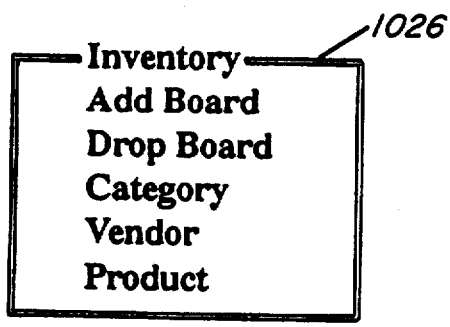

FIG. 9 is a screen display within the preferred embodiment showing the settings for a Microsoft Mouse controller board. The display window 1018 describes the type of hardware element, the setting for the element and the resulting assignment of resources for the setting for two different hardware elements on the mouse controller board. The hardware elements are described as part of the circuit board file. The specific language conventions used within a circuit board .CBF file to describe the switches, jumper blocks and other hardware information is described in detail in Appendix 1, Sections 5.0-6.4.3.

The preferred embodiment is capable of displaying the various types of hardware elements and their proper settings based on an initial value. In Appendix 1, Section 5.3.2 describes the format for an inline jumper and the resulting assignment of resources. FIG. 9 depicts J4 as a four position, dual jumper block used to assign interrupt request lines. In FIG. 9, the preferred embodiment shows the mouse controller card requesting IRQ 2 and the proper jumper setting to reflect this resource allocation. Similarly, item two depicts a single position, tri-pole jumper block J3 and the proper setting for the assignment of PORT address 23 Ch for the mouse controller. It will be appreciated that other boards may have additional hardware elements such as DIP switches or other elements. The preferred embodiment will display all of the hardware settings for a selected circuit board which has been properly described in accordance with Appendix 1.

It will be appreciated that the capability of displaying various hardware elements and their proper settings for circuit boards within a system will greatly reduce the time and effort required to initialize the circuit boards. As described in FIG. 14, the preferred embodiment is capable of displaying the settings for a single board, all boards within a selected computer system, or only those boards having changed settings as a result of a new configuration. Further, the preferred embodiment is capable of displaying a resource allocation listing or resource map for all boards within a selected system.

The setting of various hardware elements on a circuit board does not guarantee that resource request conflicts among the various circuit boards will not arise. The operator may attempt to determine whether a given configuration will work based on the viewed settings. However, it will be appreciated that the time required for a person to arrive at a valid configuration for all boards within the system and all of proper board settings would be long and exhaustive. The preferred embodiment provides for an interface with the configuration utility described in copending U.S. patent application Ser. No. 293,315.

Once computer system .CPQ files and board .CBF files and their settings have been established, the operator may select to configure the computer system and boards. The operator may select to add a board to an existing system. In some instances the operator may wish to maintain a known working configuration for the computer system when attempting to add a new board to the system. If such is the case, the operator will select the NEW BOARDS option (FIG. 15, step 346). Alternatively, the operator may select to reconfigure all boards within the computer system. In this instance, the operator would select the ALL BOARDS sub-menu choice (FIG. 15, step 364).

The actual configuration of this system takes place in FIG. 15 step 356. Based on the board .CBF and system .CPQ files, the preferred embodiment calls a configuration utility which attempts to configure the system by cycling through all possible choices indicated and the order indicated in the function resource fields of the configuration files for each board. The configuration utility selects the first option in each case for each board and determines if a conflict exists between the various boards within the system. If a conflict exists, the configuration utility begins to assign alternative resources or options, where permitted to, until either a nonconflicting set of resources appears or all possible combinations have been attempted.

It will be appreciated that if the NEW BOARD option has been selected, the prior circuit board configuration remains locked. Thus, the configuration utility will be unable to consider the assignment of alternative resources or options for these locked boards. Where all boards may be configured, the locks are removed for existing circuit boards, permitting the configuration utility to cycle through assignment of all alternative resources, if required. If the configuration utility finds a selection of choices for each board such that the requirement for common computer resources can be met for all circuit boards designated and functions requested without conflict, the preferred embodiment will display a configuration successful message and give the operator the option to store the particular configuration. If the configuration utility determines that there is no viable set of resource assignments which will not give rise to a resource conflict, the preferred embodiment will display a configuration unsuccessful message. The preferred embodiment then gives the operator the option to lock a successful configuration and save the configuration.

The configuration utility may assign resources which differ from those initially set by the preferred embodiment, The operator may choose to review all of the board settings or simply board settings which have changed as a result of the configuration attempt. It will be appreciated that if the preferred embodiment of the present invention is being run on the system being configured, the configuration file will be saved in permanent storage which may be accessed by the system being configured upon each power up.

It will be further appreciated that the preferred embodiment will significantly decrease the amount of time require to configure a new or an existing computer system. Further, since the preferred embodiment may be practiced on a computer system which is not the subject of the configuration process, the operator may use the preferred embodiment to model the configuration for other computers and circuit boards and determine in advance of obtaining the actual systems and circuit boards whether a viable configuration is possible.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the preferred embodiment.

The program includes a number of menu options for performing additional functions.

The File menu includes options as follows:

OPEN—Load system definition files from disk. Gives list of files (of file type .CPQ), lets user select by moving highlighted bar. Selected file is displayed as System Box: user accepts or chooses another. This function is invoked automatically at program startup.

SAVE—Saves the current System Box as a CPQ file. The option is given to save under its original or a newly specified name, and to change the title of the System before it is saved.

QUIT—Returns to operating system. If boards were added to or deleted from inventory file, gives option to save updated inventory list as new BOARDS.CBF file.

The View menu includes the following menu items:

SETTINGS—Displays the Settings Window for the current board, where current board is (a) In-Hand or (b) the highlighted board in the System Box or the Boards Inventory. The Settings Window fills most of screen, is scrollable to view settings information, with Print option to dump window to printer.

CHANGES ONLY—Display is the same as for SETTINGS, but shows each board that had settings changed due to a Reconfiguration request. This allows a reconfiguration of previously installed boards to be done and only the boards that were changed to be displayed. The Print option is active for this display.

ALL BOARDS—Display is the same as for SETTINGS, except all boards are included in the display. Same as if each board were selected one at a time and the SETTINGS displayed. Print option is active for this display.

RESOURCE MAP—Uses Settings Window to display (with Print option) all system resources allocated, by resource type, cross-indexed to the board claiming each resource.

The Configure menu includes functions as follows:

NEW BOARDS—Forces a configuration with only the newly added and not yet INSTALLED boards resources subject to change. Installed boards have their resources "locked" in place.

RECONFIGURE ALL—Forces a configuration of all boards in the system. This "unlocks" previously installed boards and makes their resources and settings to subject to change during the configuration, along with the newly added boards resources.

LOCK CONFIGURATION—"Locks" the resource selection of the current configuration in place. The resources of the boards "locked" in the system will no longer be subject to change during subsequent configuration attempts. Resources on boards "locked" in place will participate in the configuration process, but they are not subject to change unless specifically requested by the user. This can be done by choosing RECONFIGURE ALL from this menu or, when a resource conflict is found, replying "Y" to the "OK to Reconfigure" option given in the Resource Conflict Window.

The Inventory menu includes functions as follows:

ADD BOARD—Allows ad hoc definition for minimal configuration data on boards not found in database. Board Detail Window appears, allows input of data, stores definition in the Boards Inventory file BOARDS.CDF.

DROP BOARD—Marks the "current" board as deleted from the Inventory List. If board is already marked "deleted", then "undeletes" it. Adding or dropping boards causes the program to issue a prompt when quitting a session to allow updating of BOARDS.CBF with the new inventory data.

CATEGORY/VENDOR/PRODUCT—The current selection of these three sort orders for the Boards Inventory is marked with an asterisk. To select a different sort sequence for the Boards Inventory, the user selects one of these entries. The inventory is immediately sorted and redisplayed in the chosen sequence.

It will be understood that the form of the invention presented here is for purposes of illustration; the invention may be implemented in many ways not described here. The invention is accordingly not limited to the description herein, but is intended to be construed as broadly as is set forth in the following claims.

What is claimed is:

1. For use with a computer system and a operator, an interactive display method for controlling the configuration of a plurality computer systems and circuit boards, the computer systems providing for interchangeable circuit boards to be inserted in a plurality of system slot locations, the circuit boards having a plurality of selectable operational functions, the circuit boards further having a plurality of hardware and software settings which permit the circuit boards to be configured to utilize one or more common computer resources, the steps comprising:

the computer accessing and displaying stored descriptions of a plurality of circuit boards;
the operator selecting circuit boards to be configured with said selected computer system from said displayed list of circuit boards;
the computer assigning each of said selected circuit boards to a slot in said selected system;
the computer displaying available operational functions for said circuit boards;
the operator selecting operational functions to be activated for said selected circuit boards;
the operator invoking a configuration utility to allocate common computer resources to said selected circuit boards; and
the computer displaying the results of said configuration allocation;
the computer displaying the required settings for said circuit boards based on said configuration allocation; and
the computer storing said configuration allocation for said selected circuit boards and computer system.

2. The method of claim 1, further including the computer displaying required settings for circuit boards based on configuration allocation of common computer resources.

3. The method of claim 1, wherein the step of displaying required settings includes displaying jumpers on said selected circuit boards and the required jumper settings, thereby instructing the operator on the required jumper settings on said selected circuit board.

4. The method of claim 1, wherein the step of displaying required settings includes displaying switches on said selected circuit boards and the required switch settings, thereby instructing the operator on the required switch settings on said selected circuit board.

5. The method of claim 1, wherein said method may be used to configure the computer running the interactive display method.

6. The method of claim 1, wherein said method may be used to configure a computer other than the computer running the interactive display method.

7. The method of claim 1, further comprising the operator creating and storing a new description for a circuit board.

8. The method of claim 1, wherein the operator assigns said selected circuit boards to the slots.

9. The method of claim 1, further comprising the computer displaying common computer resources which may be utilized by said selected circuit boards.

10. The method of claim 1, further comprising the computer displaying common computer resources which have been allocated to said circuit boards.

11. The method of claim 1, further comprising the computer maintaining a prior allocation of common computer resources during the configuration process where said selected computer system has previously been configured with other circuit boards.

12. The method of claim 1, further comprising
the computer accessing and displaying stored descriptions of a plurality computer systems; and
the operator selecting a computer system to be configured from said displayed list of computer systems.

13. The method of claim 1, further comprising the computer displaying required settings for said circuit boards based on selected operational functions.

* * * * *